Aug. 19, 1952     A. J. RINCK     2,607,694
METHOD FOR PREVENTING DECAY OF CITRUS FRUITS, VEGETABLES, ETC
Filed July 21, 1948
FIG. I.
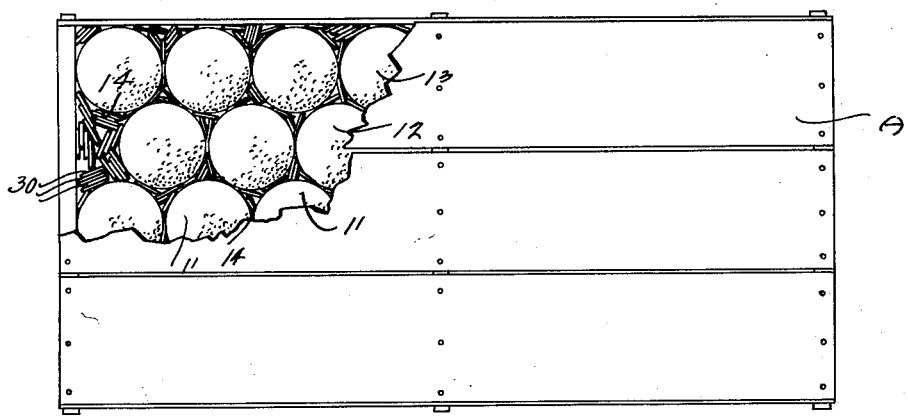
FIG. 2.
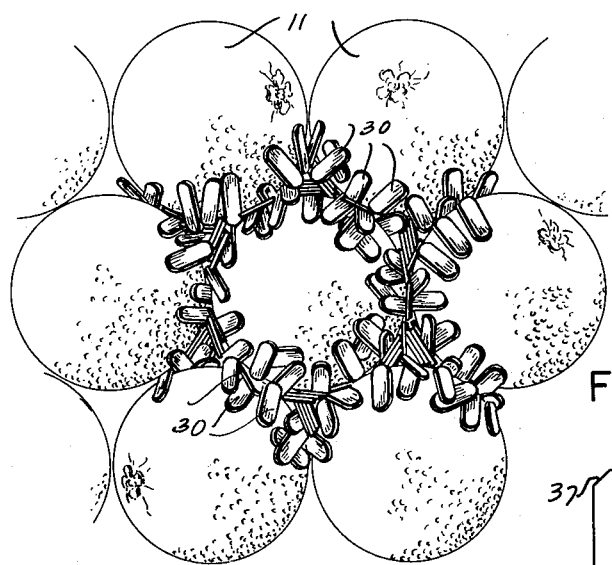
FIG. 3.
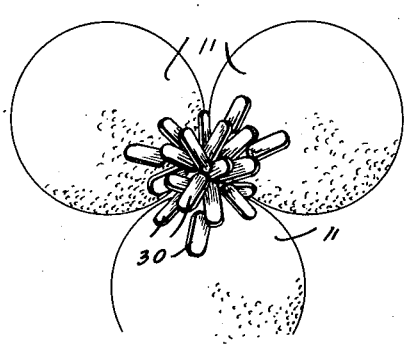
FIG. 4.
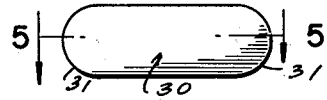
FIG. 5.
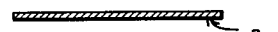
FIG. 6.
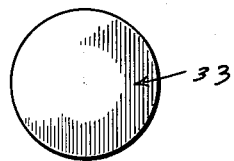
FIG. 7.
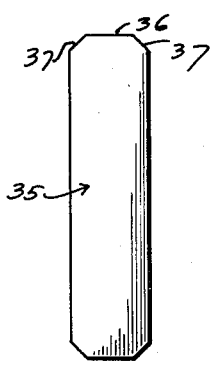
FIG. 8.
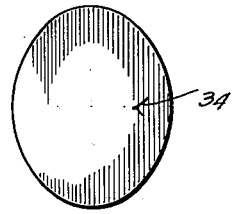
INVENTOR.
Alphonse J. Rinck
BY *Lancaster, Allwine & Rommel*
ATTORNEYS.

Patented Aug. 19, 1952

2,607,694

UNITED STATES PATENT OFFICE 2,607,694

METHOD FOR PREVENTING DECAY OF CITRUS FRUITS, VEGETABLES, ETC.

Alphonse J. Rinck, Pomona Park, Fla.

Application July 21, 1948, Serial No. 39,856

2 Claims. (Cl. 99—154)

This invention relates to improvements in methods and means to prevent formation of molds and decay of citrus fruits and vegetables.

The primary object of this invention is the provision of an improved vehicle for supporting a mold inhibiting chemical in such manner as to best provide for free circulation of the chemical vapor among packed citrus fruit.

A further object of this invention is the provision of an inherently flexible but stiff absorbent card or paper, preferably of a size smaller than the maximum dimension of the individual fruit with which it is to be packed, adapted to support a mold or spore inhibiting chemical such as diphenyl.

Other objects and advantages of the invention will be apparent from the following detailed description.

In the accompanying drawing, forming a part of this specification, and wherein similar reference characters designate corresponding parts thruout the several views, Figure 1 is a side elevation of a conventional case in which citrus fruit such as oranges, lemons and grapefruit are packed; the view showing a portion of the wall of the case removed and the manner in which the improved chemical supporting members are assembled with respect to the packed citrus fruit.

Figure 2 is a plan view of a layer of the fruit showing one way in which the improved chemical supporting absorbent members arrange themselves between the fruit and in the voids formed by the packed fruit.

Figure 3 is a similar view showing how the stiff members may fall in one of the voids between packed fruit.

Figure 4 is a plan view of one form of stiff absorbent member.

Figure 5 is a cross sectional view showing that the absorbent member has sufficient thickness to render it inherently stiff, similar to flexible cardboard.

Figures 6, 7 and 8 are views showing other shapes which the inherently stiff member may assume; all of them being flat.

In the drawing, wherein for the purpose of illustration is shown only a preferred embodiment of the invention, the letter A may generally designate a conventional case wherein citrus fruit such as oranges, lemons or grapefruit may be packed. They are shown arranged in rows or layers 11, 12 and 13; the fruit in adjacent layers being staggered with respect to each other. Obviously, due to the curvature of citrus fruit, such as grapefruit and oranges, voids 14 are formed.

I am aware that spore and mold formations can be prevented by refrigeration; spraying or submergence in liquid chemicals which, after drying, leave mold inhibiting deposit, and wrapping the fruit or vegetables in chemically treated wrapping paper or material. It has also been proposed to line the shipping container with chemically treated sheets of paper or material for the purpose of sealing off free movement of air.

Many of the above methods of mold prevention are objectionable. Refrigeration is expensive and not entirely satisfactory under all circumstances; spraying or submerging the fruit or vegetable in the chemical leaves a deposit which is sometimes objectionable in appearance. This mode of application is also expensive. Wrapping the fruit or vegetable in chemically treated paper prevents free circulation of air and is further an expensive method of treatment, and lining a shipping container with paper to prevent free circulation of air in a confined space, accelerates decay.

The preferred carrier for the chemical as shown at 30 in Figures 4 and 5 of the drawing consists of fibrous stiff paper or card-like material of an absorbent nature. It may be inherently flexible but is shape retaining except under the application of some force. In this respect, it is different from thin paper such as heretofore used in packing of oranges and fruits. The member 30 is elongated and convexly shaped at its ends 31. As shown in Figure 6 the member 33 may take the form of a flat disc. In Figure 8 the member 34 may be of oval or elliptical form. In Figure 7 the member 35 is elongated and in lieu of convex ends the margins 36 are normal to the side edges of the member, with the corners obliquely cut away as indicated at 37. In lieu of such forms the inherently stiff material may be of ring or segmental shape.

The stiff paper or card-like material is impregnated for at least part of its thickness with the chemical. The chemical supporting member may vary widely in nature, but is preferably fibrous and absorbent. It is to be noted that its size is such that at its greatest dimension it measures less than the maximum diameter of the vegetable or fruit with which it may be associated so as to fall freely into the voids between the packed fruit. The preferred mold inhibiting chemical is diphenyl dissolved in wax, paraffin or some diluent, and with it may be used volatile or deodorizing oils, etc. The chemical may be applied to the shape retaining member by soaking or spraying. Preferably, the chemical includes 10% diphenyl, (by volume) and 90% of carrying ingredients, etc. The chemical volatizes, and the released gases have an inhibiting and destructive effect upon rot spores and fungi.

The low cost of the present means of application of the mold or spore inhibiting chemical is an important consideration. An experienced fruit packer will pack six thousand fruit per hour under normal circumstances. If packers are required to wrap each fruit individually or to line a cabinet or packing container, it can readily be appreciated that the cost of fruit packing will be very substantial. With the present invention the packer can quickly scatter the chemical carrying members between the layers, that is, on top of the last formed layer. The chemical supporting member will drop into voids and fit between the fruit, as shown in Figures 1 and 2. The rounded or obliquely formed edging prevents damage to the fruit and because of their stiffness they do not lay in too close confinement with the article. Air can pass around the fruit and also across the surfacing of the cards or stiff paper members and permit volatilization of the chemical or inhibitor. The chemical carrying cards may stand upright between the fruit and generally they do not fall from layer to layer, due to the fact that the fruits of adjacent layers are staggered. If desired, the members of this invention may be scattered only in the central layer of the carton or case.

While it will be apparent from the foregoing that many advantages are inherent in the improved means herein described for inhibiting spore and mold growths, among others there will be absence of heat subjection as is the case in borax treatment; no special equipment is necessary; no chemical deposit forms on the fruit or vegetable; the size and shape of the chemical carrying members promotes the free circulation of air and the cost of packing is materially reduced. Furthermore, the chemicals may be applied fresh upon the chemical carrying cards or stiff paper pieces with full strength application and volatizes where it will be of greatest value; that is, directly around the fruit. While the chemical carrying members do not constitute a packaging aid, they are visible to the purchaser and a constant reminder that an inhibitor is packed with the oranges. They are in such position that they do not interfere with immediate access to the fruit. Therefore, there will be no loss of time in unwrapping, etc.

Various changes in the shape, size and arrangement of the chemical carrying cards, and in the method of application thereto, may be made to the form of invention herein described without departing from the spirit of the invention or the scope of the claims.

I claim:

1. The method of inhibiting mold growth upon citrus fruit and the like which consists in distributing between the fruit and within the voids between the fruit during the packing operation a plurality of mold growth inhibitor supporting bodies of thin relatively stiff material of individual sizes to freely fall into the voids between the fruit.

2. The method of inhibiting mold growth upon citrus fruit and the like which consists in distributing between the fruit and within the voids between the fruit during the packing operation a plurality of mold growth inhibitor shallow but elongated supporting bodies of relatively stiff material, the bodies being of maximum length less than the thickness of the individual fruits.

ALPHONSE J. RINCK.

REFERENCES CITED

The following references are of record in the file of this patent:

UNITED STATES PATENTS

| Number | Name | Date |
|---|---|---|
| 2,173,453 | Mispley et al. | Sept. 19, 1939 |
| 2,178,675 | Thomas | Nov. 7, 1939 |
| 2,336,291 | Phillips | Dec. 7, 1943 |